(12) United States Patent
Kuwabara

(10) Patent No.: US 12,286,521 B2
(45) Date of Patent: Apr. 29, 2025

(54) RESIN COMPOSITION FOR PRODUCTION OF FOAM PARTICLES, FOAM PARTICLES, FOAM MOLDED BODY AND COMPOSITE STRUCTURE MEMBER

(71) Applicant: SEKISUI PLASTICS CO., LTD., Osaka (JP)

(72) Inventor: Yusuke Kuwabara, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 774 days.

(21) Appl. No.: 17/598,451

(22) PCT Filed: Jan. 28, 2020

(86) PCT No.: PCT/JP2020/002992
§ 371 (c)(1),
(2) Date: Sep. 27, 2021

(87) PCT Pub. No.: WO2020/195118
PCT Pub. Date: Oct. 1, 2020

(65) Prior Publication Data
US 2022/0169819 A1 Jun. 2, 2022

(30) Foreign Application Priority Data

Mar. 28, 2019 (JP) ................................ 2019-064051

(51) Int. Cl.
*C08J 9/16* (2006.01)
*C08J 9/00* (2006.01)
*C08J 9/232* (2006.01)
*C08L 69/00* (2006.01)

(52) U.S. Cl.
CPC ............. *C08J 9/232* (2013.01); *C08J 9/0061* (2013.01); *C08L 69/00* (2013.01); *C08J 2201/03* (2013.01); *C08J 2201/038* (2013.01); *C08J 2369/00* (2013.01)

(58) Field of Classification Search
CPC ...... C08J 9/232; C08J 9/0061; C08J 2201/03; C08J 2201/038; C08J 2369/00; C08J 9/122; C08J 9/18; C08J 2201/034; C08J 2203/06; C08J 2367/02; C08J 9/36; C08J 2467/02; C08J 2469/00; C08L 69/00; C08L 67/02; C08L 69/02; B32B 5/245; B32B 2260/046; B32B 2262/0253; B32B 2262/101; B32B 2262/103; B32B 2262/105; B32B 2262/106; B32B 2307/30; B32B 2307/308; B32B 2307/56; B32B 2307/718; B32B 5/02; B32B 5/18; B32B 2260/021; B32B 2262/0269; B32B 2266/0264; B32B 2307/702; B32B 2307/72; B32B 2439/00; B32B 2439/62; B32B 2479/00; B32B 2509/00; B32B 2571/00; B32B 2603/00; B32B 2605/003; B32B 2605/08; B32B 2605/18

See application file for complete search history.

(56) References Cited

U.S. PATENT DOCUMENTS

| | | |
|---|---|---|
| 10,093,796 B2 | 10/2018 | Enomoto et al. |
| 2014/0296422 A1 | 10/2014 | Enomoto et al. |
| 2015/0247037 A1 | 9/2015 | Sugioka et al. |

FOREIGN PATENT DOCUMENTS

| | | | | |
|---|---|---|---|---|
| EP | 2 586 819 | | 5/2013 | |
| GB | 2425127 A | * | 10/2006 | ............ C08L 67/025 |
| JP | 2004-182938 | | 7/2004 | |
| JP | 2004202971 A | * | 7/2004 | |
| JP | 2014-70153 | | 4/2014 | |
| JP | 2014-77123 | | 5/2014 | |
| JP | 2014077123 A | * | 5/2014 | |
| JP | 2015-193723 | | 11/2015 | |
| JP | 2016125041 A | * | 7/2016 | |
| JP | 2017-2236 | | 1/2017 | |
| JP | 2017-19932 | | 1/2017 | |
| JP | 6279496 | | 2/2018 | |
| JP | 2019183099 A | * | 10/2019 | ............ C08L 67/025 |
| JP | 2020-50794 | | 4/2020 | |
| WO | 2013/065740 | | 5/2013 | |
| WO | 2014/061429 | | 4/2014 | |

OTHER PUBLICATIONS

Extended European Search Report issued Nov. 9, 2022 in corresponding European Patent Application No. 20779660.8.
International Search Report issued Apr. 14, 2020 in International (PCT) Application No. PCT/JP2020/002992.

* cited by examiner

*Primary Examiner* — K. Boyle
(74) *Attorney, Agent, or Firm* — Wenderoth, Lind & Ponack, L.L.P.

(57) ABSTRACT

An object of the present invention is to provide a resin composition that can produce a foam molded body having a beautiful appearance while exhibiting excellent mechanical properties. The above object is achieved by a resin composition for producing foam particles, the resin composition comprising a base resin containing a polycarbonate resin having a glass transition temperature of 140 to 155° C. and an amorphous polyester resin having a glass transition temperature of 100 to 130° C., and the amorphous polyester containing a unit derived from a cyclic diol.

9 Claims, No Drawings

RESIN COMPOSITION FOR PRODUCTION OF FOAM PARTICLES, FOAM PARTICLES, FOAM MOLDED BODY AND COMPOSITE STRUCTURE MEMBER

TECHNICAL FIELD

The present invention relates to a resin composition for producing foam particles, foam particles, a foam molded body, and a composite structure member. More specifically, the present invention relates to a resin composition for producing foam particles that can yield a foam molded body with improved appearance and mechanical properties, foam particles, a foam molded body, and a composite structure member.

BACKGROUND ART

Due to their light weight, good formability and shape retention, and relatively high strength, foam molded bodies are used in various fields, such as food trays, automobile members, construction materials, civil engineering materials, and lighting fixtures. In particular, when heat resistance is not required, foam molded bodies made of polystyrene resins tend to be used, and when buffer characteristics, recovery properties, flexibility, etc., are required, foam molded bodies made of olefin resins, such as polypropylene and polyethylene, tend to be used.

Polycarbonate resins generally have higher heat resistance than that of these polystyrene resins and olefin resins. These are resin materials that can be used in countries other than Japan and in harsh climates, such as arid and tropical zones. Such polycarbonate resins are excellent not only in heat resistance, but also in water resistance, electrical properties, mechanical strength, ageing resistance, and chemical resistance. For this reason, polycarbonate resins have been used as interior materials for buildings; in recent years, they are expected to be applied to automobile members, packaging materials, various containers, etc., by utilizing their excellent characteristics. In addition, polycarbonate resin foam bodies are expected to be applied to core materials of fiber-reinforced plastics due to their high heat resistance.

However, polycarbonate resins were inferior in foaming properties due to their high melt viscosity and low melt tension. Furthermore, in a molding method such as an in-mold foaming method in which foam particles are filled in a die and molded, the foam particles need to be secondarily foamed until the voids in the die are filled. For that purpose, it is necessary for the foam particles to maintain a bubble structure in a softened state. Therefore, foam particles used for in-mold foaming are required to have high foaming properties.

Accordingly, the applicant of the present application has proposed a foam molded body, whose mechanical properties are improved to some extent by using foam particles containing a polycarbonate resin as a base resin and having a bottom hole or a through hole (PTL 1).

CITATION LIST

Patent Literature

PTL 1: JP6279496B

SUMMARY OF INVENTION

Technical Problem

However, the appearance of the foam molded body of PTL 1 was not beautiful. For this reason, it has been desired to provide foam particles that can produce a foam molded body having a beautiful appearance while exhibiting excellent mechanical properties, and a resin composition for producing foam particles.

Solution to Problem

As a result of further examination of the technique of PTL 1, the present inventor surprisingly found that foam molded bodies having a beautiful appearance while improving mechanical properties can be provided by adding an amorphous polyester resin to a polycarbonate resin, without using foam particles having a special shape. Thus, the present invention has been completed.

Accordingly, the present invention provides a resin composition for producing foam particles, the resin composition comprising a base resin containing a polycarbonate resin having a glass transition temperature of 140 to 155° C. and an amorphous polyester resin having a glass transition temperature of 100 to 130° C., and the amorphous polyester containing a unit derived from a cyclic diol.

The present invention also provides foam particles obtained by foaming the above resin composition for producing foam particles.

Further, the present invention provides a foam molded body obtained by foaming and molding the above foam particles.

In addition, the present invention provides a composite structure member having the above foam molded body and a skin material integrally laminated on a surface of the foam molded body.

Advantageous Effects of Invention

The present invention can provide a resin composition for producing foam particles that can yield a foam molded body having a beautiful appearance while exhibiting excellent mechanical properties (e.g., compression strength).

Further, in any of the following cases, it is possible to provide a resin composition for producing foam particles that can yield a foam molded body having a beautiful appearance while exhibiting more excellent mechanical properties.

(1) The polycarbonate resin and the amorphous polyester resin are contained at a mass ratio of 95:5 to 5:95 in the base resin.
(2) The cyclic diol contains one or more rings selected from a saturated hydrocarbon ring and a saturated heterocyclic ring as a constituent.
(3) The cyclic diol is selected from 1,4-cyclohexanedimethanol, 2,2,4,4-tetramethyl-1,3-cyclobutanediol, and spiroglycol.
(4) The resin composition has a glass transition temperature of 115 to 145° C.
(5) The resin composition shows a melt mass-flow rate of 15 to 25 g/10 min.
(6) The resin composition shows a melt tension of 0.6 to 1.5 cN.

DESCRIPTION OF EMBODIMENTS

Resin Composition

The resin composition for producing foam particles comprises a base resin containing a polycarbonate resin and an amorphous polyester resin.

(1) Base Resin

The total ratio of the polycarbonate resin and the amorphous polyester resin in the base resin is preferably 70 mass % or more, more preferably 85 mass- or more, and may be 100 mass.

(a) Polycarbonate Resin

The polycarbonate resin preferably has a polyester structure of carbonic acid and glycol or a divalent phenol. From the viewpoint of further increasing the heat resistance, the polycarbonate resin preferably has an aromatic skeleton. Specific examples of the polycarbonate resin include polycarbonate resins derived from bisphenols, such as 2,2-bis(4-oxyphenyl)propane, 2,2-bis(4-oxyphenyl)butane, 1,1-bis(4-oxyphenyl)cyclohexane, 1,1-bis(4-oxyphenyl)butane, 1,1-bis(4-oxyphenyl)isobutane, and 1,1-bis(4-oxyphenyl)ethane.

Examples of the polycarbonate resin include linear polycarbonate resins and branched polycarbonate resins, and both resins may be blended.

The polycarbonate resin preferably has a glass transition temperature of 140 to 155° C. When the glass transition temperature is 140° C. or higher, the heat resistance of the resulting foam molded body is improved. When the glass transition temperature is 155° C. or less, the foaming properties of the foam particles are improved, heat fusion integration between the foam particles is facilitated, and the mechanical properties of the foam molded body are improved. The glass transition temperature is preferably 143 to 152° C., more preferably 145 to 152° C., and particularly preferably 145 to 150° C.

The polycarbonate resin may have a mass average molecular weight of 30,000 to 90,000. When the mass average molecular weight is 30,000 or more, the mechanical properties of the resulting foam molded body are improved. When the mass average molecular weight is 90,000 or less, the foaming properties of the foam particles are improved, heat fusion integration between the foam particles is facilitated, and the mechanical properties of the foam molded body are improved. The mass average molecular weight is preferably 30,000 to 70,000, and more preferably 40,000 to 60,000.

(b) Amorphous Polyester Resin

The amorphous polyester resin is preferably selected from copolymer resins of polycarboxylic acids and polyols, and more preferably selected from copolymer resins of polycarboxylic acids and cyclic diols. "Amorphous" means that neither an exothermic peak due to crystallization nor an endothermic peak due to the melting of crystals is found in a DSC curve obtained by DSC measurement.

Examples of polycarboxylic acids include aromatic dicarboxylic acids, such as terephthalic acid, isophthalic acid, 2-methylterephthalic acid, 2,6-naphthalenedicarboxylic acid, 1,4-naphthalenedicarboxylic acid, 1,5-naphthalenedicarboxylic acid, 2,7-naphthalenedicarboxylic acid, biphenyldicarboxylic acid, and tetralindicarboxylic acid; aliphatic dicarboxylic acids, such as succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, and 5-carboxy-5-ethyl-2-(1,1-dimethyl-2-carboxyethyl)-1,3-dioxane; and the like.

The polycarboxylic acid is preferably selected from terephthalic acid and isophthalic acid.

Polyols include cyclic diols.

Examples of Cyclic Diols Include:

cyclic diols having a saturated hydrocarbon ring, such as 1,3-cyclobutanediol, 2,2,4,4-tetramethyl-1,3-cyclobutanediol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralin dimethanol, norbornene dimethanol, tricyclodecane dimethanol, and pentacyclododecane dimethanol;

cyclic diols having a saturated heterocyclic ring, such as spiroglycol (3,9-bis(1,1-dimethyl-2-hydroxyethyl)-2,4,8,10-tetraoxaspiro[5.5]undecane) and 5-methylol-5-ethyl-2-(1,1-dimethyl-2-hydroxyethyl)-1,3-dioxane; and cyclic diols having an aromatic ring, such as bisphenol compounds (e.g., 4,4'-(1-methylethylidene)bisphenol (bisphenol A), methylene bisphenol (bisphenol F), 4,4'-cyclohexylidenebisphenol (bisphenol Z), and 4,4'-sulfonylbisphenol (bisphenol S)) and alkylene oxide adducts thereof, and aromatic dihydroxy compounds (e.g., hydroquinone, resorcinol, 4,4'-dihydroxybiphenyl, 4,4'-dihydroxydiphenyl ether, and 4,4'-dihydroxydiphenylbenzophenone).

The cyclic diol is preferably selected from 1,4-cyclohexanedimethanol, 2,2,4,4-tetramethyl-1,3-cyclobutanediol, and spiroglycol.

The amorphous polyester resin may be a copolyester of a polyester derived from terephthalic acid and 1,4-cyclohexanedimethanol, and a polyester derived from terephthalic acid and 2,2,4,4-tetramethyl-1,3-cyclobutanediol.

The polyol may contain a diol other than cyclic diols. Examples of such diols include chain diols, such as ethylene glycol, trimethylene glycol, 1,4-butanediol, 1,5-pentanediol, 1,6-hexanediol, diethylene glycol, propylene glycol, neopentyl glycol, polyethylene glycol, polypropylene glycol, and polybutylene glycol.

The polycarboxylic acid and polyol are preferably selected so that an amorphous polyester resin produced therefrom has a glass transition temperature of 100 to 130° C. The polycarboxylic acids and polyols each may be used singly or in combination of two or more. When the glass transition temperature is 100° C. or higher, the resulting foam molded body has excellent heat resistance. When the glass transition temperature is 130° C. or less, the foaming properties of the foam particles are improved, heat fusion integration between the foam particles is facilitated, and the mechanical properties of the foam molded body are improved. The glass transition temperature is preferably 105 to 125° C., and more preferably 108 to 123° C.

The glass transition temperature of the amorphous polyester resin is preferably lower than the glass transition temperature of the polycarbonate resin in the range of 15 to 50° C. Within this range, the appearance and mechanical properties are improved. The glass transition temperature of the amorphous polyester resin is more preferably lower than the glass transition temperature of the polycarbonate resin in the range of 20 to 45° C., even more preferably 25 to 42° C., and particularly preferably 25 to 40° C.

The amorphous polyester resin may have an IV value (intrinsic viscosity) of 0.55 to 0.80. When the IV value is within this range, the foaming properties of the foam particles are improved, heat fusion integration between the foam particles is facilitated, and the mechanical properties of the foam molded body are improved. The IV value is preferably 0.58 to 0.78, and more preferably 0.60 to 0.75.

(c) Content Ratio of Polycarbonate Resin and Amorphous Polyester Resin

The polycarbonate resin and the amorphous polyester resin are preferably contained at a mass ratio of 95:5 to 5:95 in the base resin. When the content ratio is within this range, the foaming properties of the foam particles are improved, heat fusion integration between the foam particles is facilitated, and the mechanical properties of the foam molded body are improved. The content ratio is more preferably 90:10 to 10:90, and even more preferably 80:20 to 20:80.

(d) Other Resins and Additives

The base resin may contain resins other than the polycarbonate resin and the amorphous polyester. Examples of other resins include acrylic resins, saturated polyester resins, ABS resins, polystyrene resins, polyphenylene oxide resins, and the like.

The base resin may contain, if necessary, additives in addition to the resins. Examples of additives include plasticizers, flame retardants, flame retardant aids, antistatic agents, spreading agents, foam regulators, fillers, colorants, weathering agents, anti-aging agents, lubricants, anti-fogging agents, fragrances, and the like.

(e) Physical Properties

The resin composition preferably shows a melt mass-flow rate of 15 to 25 g/10 min. When the melt mass-flow rate is 15 g/10 min or more, the foaming properties of the foam particles are improved, heat fusion integration between the foam particles is facilitated, and the mechanical properties of the foam molded body are improved. When the melt mass-flow rate is 25 g/10 min or less, the foaming properties are improved. The melt mass-flow rate is more preferably 17 to 24 g/10 min, and even more preferably 20 to 23 g/10 min.

The resin composition preferably shows a melt tension of 0.6 to 1.5 cN. When the melt tension is 0.6 cN or more, the foaming properties are improved, and the foam molded body becomes lighter. When the melt tension is 1.5 cN or less, excessive foaming can be suppressed, and density control is facilitated. The melt tension can be, for example, 0.65 to 1.5 cN or 0.7 to 1.5 cN, more preferably 0.65 to 1.4 cN, and even more preferably 0.7 to 1.3 cN.

Foam Particles

The foam particles can be obtained by foaming the resin composition for producing foam particles.

The foam particles preferably have a bulk multiple of 2 to 30 times. If the bulk multiple is lower than 2 times, the bubbles of the foam particles may become uneven, which may make the foaming properties of the foam particles insufficient during foam molding. If the bulk multiple is larger than 30 times, the open cell percentage of the foam particles may increase, and the foaming properties of the foam particles may decrease during foaming in foam molding. The bulk multiple is more preferably 3 to 25 times, and particularly preferably 5 to 20 times. The bulk density is the reciprocal of the bulk multiple. That is, bulk density=1/bulk multiple.

The outer shape of the foam particles is not particularly limited, as long as they can produce a foam molded body. Examples include spherical, substantially spherical, and cylindrical shapes. The foam particles preferably have an outer shape indicated by an average aspect ratio of 0.7 or more, and more preferably 0.7 to 1.

The average particle size of the foam particles is preferably 1000 to 4000 μm, and more preferably 1500 to 3000 μm.

As the method for producing foam particles, any known method for producing foam particles from base resins can be applied. For example, base resin particles are impregnated with a foaming agent in the gas phase to obtain expandable particles, and the expandable particles are foamed to obtain foam particles.

The resin particles can be obtained by using known production methods and production equipment. For example, the resin particles can be produced by melting and kneading a resin composition using an extruder, followed by extrusion and granulation by cutting in water (under-water cutting), strand cutting, or the like. The temperature, time, pressure, etc. during melt kneading can be suitably set according to the raw material used and the production equipment.

The melt-kneading temperature in the extruder during melt kneading is preferably 260 to 330° C., and more preferably 270 to 300° C., which is a temperature at which the raw material resin is sufficiently softened. The melt-kneading temperature refers to the temperature of the melt-kneaded product in the extruder, determined by measuring the center temperature of the melt-kneaded product flow path near the extruder head by a thermocouple thermometer.

Next, as the method for producing expandable particles, for example, resin particles are impregnated with a foaming agent in the gas phase in a sealable container. Examples of foaming agents include saturated aliphatic hydrocarbons, such as propane, normal butane, isobutane, normal pentane, isopentane, and hexane; ether compounds, such as dimethyl ether; freon, such as methyl chloride, 1,1,1,2-tetrafluoroethane, 1,1-difluoroethane, and monochlorodifluoromethane; inorganic gases, such as carbon dioxide and nitrogen; and the like. Of these, dimethyl ether, propane, normal butane, isobutane, and carbon dioxide are preferred; propane, normal butane, isobutane, and carbon dioxide are more preferred; and normal butane, isobutane, and carbon dioxide are particularly preferred. The foaming agents may be used singly or in combination of two or more.

The amount of the foaming agent supplied to the container is preferably 0.1 to 5 parts by mass, more preferably 0.2 to 4 parts by mass, and even more preferably 0.3 to 3 parts by mass, based on 100 parts by mass of the raw material resin. When the amount of the foaming agent is within this range, it is possible to suppress the insufficient foaming ratio when foaming the foam particles, and it is possible to suppress the decrease in viscoelasticity of the base resin due to the foaming agent acting as a plasticizer; thus, foam particles having excellent foaming properties can be obtained.

Further, as the method for producing foam particles from expandable particles, for example, the expandable particles are heated in a sealable container using a heating medium, such as water vapor. The heating conditions are, for example, a gauge pressure of 0.1 to 0.5 MPa, a temperature of 100 to 159° C., and 10 to 180 seconds.

The particle size of the foam particles can be changed by changing the diameter of the multi-nozzle die attached to the front end of the extruder.

Foam Molded Body

The foam molded body can be obtained by foaming and molding the foam particles.

The foam molded body preferably has a multiple of 2 to 30 times. If the multiple is lower than 2 times, the advantage of foaming may be diminished due to the increased mass. If the multiple is larger than 30 times, the mechanical properties may be insufficient. The multiple is more preferably 2 to 25 times, and particularly preferably 5 to 20 times.

The foam molded body preferably shows an absorbed energy of 0.55 to 1.00 J in a bending test. When the absorbed energy is 0.55 J or more, shock-absorbing performance is improved. When the absorbed energy is 1.00 J or less, elastic modulus is improved and strength is increased. The absorbed energy is more preferably 0.56 to 0.90 J, and even more preferably 0.58 to 0.80 J.

As the method for producing the foam molded body, for example, the foam particles are placed in the cavity of a die, a heating medium is supplied into the cavity to heat the foam particles for re-foaming (secondary foaming), and the re-foamed foam particles are subjected to heat fusion integration with each other due to the foaming pressure, thereby obtaining the foam molded body. Examples of the heating medium include water vapor, hot air, warm water, and the like; water vapor is preferred.

The foam molded body is excellent in lightweight properties, heat resistance, and mechanical properties, and particularly excellent in load resistance in a high-temperature environment. Therefore, the foam molded body can be suitably used, for example, for parts of transportation equipment, such as automobiles, aircraft, railroad vehicles, and ships. Examples of automobile parts include parts used near engines, exterior materials, and the like.

According to the present invention, automobile parts constituted from the foam molded body of the present invention can be provided. Examples of such automobile parts include floor panels, roofs, bonnets, fenders, undercovers, wheels, steering wheels, containers (housings), hood panels, suspension arms, bumpers, sun visors, trunk lids, luggage boxes, seats, doors, cowls, and other parts.

Composite Structure Member

A skin material may be laminated on the surface of the foam molded body, and the foam molded body and the skin material may be integrated to form a composite structure member. When the foam molded body is a foam sheet, it is not necessary that the skin material is laminated and integrated with both surfaces of the foam molded body; it is sufficient that the skin material is laminated and integrated with at least one of both surfaces of the foam molded body. The skin material may be determined according to the use of the composite structure member. In particular, in consideration of the surface hardness and mechanical properties of the composite structure member, it is preferable that the skin material is laminated and integrated with both surfaces of the foam molded body in the thickness direction.

The skin material is not particularly limited, and examples include fiber-reinforced plastics, metal sheets, synthetic resin films, and the like. Of these, fiber-reinforced plastics are preferred.

Examples of reinforcing fibers that constitute fiber-reinforced plastics include inorganic fibers, such as glass fibers, carbon fibers, silicon carbide fibers, alumina fibers, tyranno fibers, basalt fibers, and ceramic fibers; metal fibers, such as stainless steel fibers and steel fibers; organic fibers, such as aramid fibers, polyethylene fibers, and polyparaphenylene benzoxazole (PBO) fibers; and boron fibers. The reinforcing fibers may be used singly or in combination of two or more. Of these, carbon fibers, glass fibers, and aramid fibers are preferred, and carbon fibers are more preferred. These reinforcing fibers can impart excellent mechanical properties to plastics, in spite of their light weight.

The thickness of the fiber-reinforced plastic is preferably 0.02 to 2 mm, and more preferably 0.05 to 1 mm. Fiber-reinforced plastics having a thickness within this range are excellent in mechanical properties, in spite of their light weight.

The basis weight of the fiber-reinforced plastic is preferably 50 to 4000 g/m$^2$, and more preferably 100 to 1000 g/m$^2$. Fiber-reinforced plastics having a basis weight within this range are excellent in mechanical properties, in spite of their light weight.

Examples of the method used to mold the fiber-reinforced plastic include an autoclave method, a hand lay-up method, a spray-up method, a PCM (prepreg compression molding) method, a RTM (resin transfer molding) method, a VaRTM (vacuum assisted resin transfer molding) method, and the like.

The thus-obtained composite structure member is excellent in heat resistance, mechanical properties, and lightweight properties. Therefore, the composite structure member can be used in a wide range of applications in the field of transportation equipment, such as automobiles, aircraft, railroad vehicles, and ships, as well as home appliances, information terminals, and furniture.

For example, the composite structure member can be suitably used as transportation equipment parts and transportation equipment component parts (in particular, automobile parts) including structural parts that constitute the main body of the transportation equipment, wind turbine blades, robot arms, cushioning materials for helmets, agricultural product boxes, transport containers such as heat/cold insulation containers, rotor blades of industrial helicopters, and packaging materials for parts.

Examples of automobile parts include floor panels, roofs, bonnets, fenders, undercovers, wheels, steering wheels, containers (housings), hood panels, suspension arms, bumpers, sun visors, trunk lids, luggage boxes, seats, doors, cowls, and other parts.

EXAMPLES

The present invention is described in more detail below with reference to Examples and the like; however, the present invention is not limited to the Examples etc. First, the measurement methods and evaluation methods in the Examples and Comparative Examples are described.

Melt Mass-Flow Rate (MFR)

The melt mass-flow rate was measured by "b) Method of measuring time during which piston travels predetermined distance" described in the B method of JIS K 7210:1999 "Plastics—Determination of the melt mass-flow rate (MFR) and the melt volume-flow rate (WVR) of thermoplastics." Specifically, "Melt Flow Index Tester 120-SAS" (produced by Yasuda Seiki Seisakusho Ltd.) was used, and the measurement conditions were as follows: sample: 3 to 8 g, preheating: 5 minutes, load hold: 30 seconds, test temperature: 300° C., test load: 11.77 N, and piston travel distance (interval): 25 mm. The sample was previously dried in a vacuum oven at 100° C. for 3 hours or more. The number of tests was 3, and their average was taken as the value of melt mass-flow rate (g/10 min).

Melt Tension

The melt tension was measured using a capillary rheometer ("Rheologic 5000T," produced by Ceast) that was set to a temperature 100° C. higher than the glass transition temperature of the resin composition. A sample made of the resin composition was previously dried in a decompression oven at 100° C. for 3 hours or more, and then placed in a cylinder placed vertically in an upright position and having an internal diameter of 15 mm. Then, the temperature was set to a temperature 100° C. higher than the glass transition temperature of the resin composition, and the sample was heated for 5 minutes to melt. After that, a piston was inserted into the cylinder from the top, and the molten sample in the cylinder was extruded by the piston from a capillary (die diameter: 2.095 mm, die length: 8 mm, inflow angle: 90° (conical)) installed at the lower end of the cylinder at a constant extrusion speed of 0.0773 mm/s, thereby obtaining a string-like product. The extruded string-like product was passed through a tension detection pulley located below the capillary and then wound on a take-up roll. The initial speed at the beginning of winding was set to 4 mm/s, then the acceleration rate was set to 12.0 mm/s$^2$, and the winding speed was gradually increased. The winding speed when the tension observed by the tension detection pulley dropped sharply was taken as the "breaking point speed." Of the tensions observed before the breaking point speed was observed, the arithmetic average of the maximum and minimum tensions immediately before the breaking point speed was defined as melt tension. During the measurement, nitrogen gas was blown into the cylinder from the top of the cylinder using a nitrogen blanket device attached to the instrument.

Glass Transition Temperature

The glass transition temperature was measured by the method described in JIS K7121:1987 and JIS K7121:2012 "Testing Methods for Transition Temperatures of Plastics." However, the sampling method and temperature conditions were as follows. 5.5±0.5 mg of sample was placed on the bottom of an aluminum measuring container (produced by Hitachi High-Tech Science Corporation, product code: GAA-0065) without any gap, and then covered with an aluminum lid (produced by Hitachi High-Tech Science Corporation, product code: GAA-0064). Then, using a differential scanning calorimeter ("DSC7000X, AS-3," produced by Hitachi High-Tech Science Corporation), the midpoint glass transition temperature was calculated using analysis software attached to the instrument from a DSC curve obtained when the temperature was raised from 30° C. to 300° C. at a rate of 20° C./min under a nitrogen gas flow rate of 20 mL/min, the sample was taken out immediately after being held for 10 minutes, and then allowed to cool in an environment of 25±10° C., and the temperature was then raised from 30° C. to 300° C. at a rate of 20° C./min. Alumina was used as a reference substance at this time. The midpoint glass transition temperature was determined according to this standard (9.3 "How to determine glass transition temperature").

Bulk Density

The bulk density was measured according to JIS K6911:1995 "Testing methods for thermosetting plastics." Specifically, the bulk density was measured using an apparent density measuring instrument according to JIS K6911.

Bulk density (g/cm$^3$) of foam particles=[mass (g) of measuring cylinder containing sample−mass (g) of measuring cylinder]/[volume (cm$^3$) of measuring cylinder]

Density of Foam Molded Body

The mass (a) and volume (b) of a test piece (e.g., 75 mm×300 mm×30 mm) cut from the foam molded body (dried at 40° C. for 20 hours or more after molding) were each measured to three significant digits, and the density (g/cm$^3$) of the foam molded body was determined by the formula (a)/(b).

Bending Test: Maximum Point Displacement and Energy

The maximum point displacement and energy were measured by the method according to JIS K7221-1:2006 "Rigid cellular plastics—Determination of flexural properties—Part 1: Basic bending test." Specifically, a rectangular parallelepiped test piece (length 20 mm×width 25 mm×height 130 mm) was cut from the foam molded body. In the measurement, a Tensilon universal tester ("UCT-10T," produced by Orientec Corporation) was used. The maximum bending stress of bending strength was calculated using a universal tester data processing system ("UTPS-237S Ver., 1.00," produced by Softbrain Co., Ltd.).

A strip-shaped test piece was placed on a support base, and the maximum bending stress was measured under the conditions of a load cell of 1000 N, a test speed of 10 mm/min, a support base tip jig 5R, and an opening width of 100 mm. The number of test pieces was 5 or more. After conditioning for 16 hours under the second grade standard atmosphere according to symbol "23/50" (temperature: 23° C., relative humidity: 50%) in JIS K 7100:1999, the measurement was performed under the same standard atmosphere. The arithmetic average of the maximum bending energies of the test pieces was defined as the absorbed energy of the foam molded body.

Appearance of Foam Molded Body

The appearance of the foam molded bodies was visually evaluated according to the following criteria.
A: The surface was fine and smooth (good appearance).
B: Although the surface was fine, some unevenness due to voids was found on the surface.
C: The surface was rough and significantly uneven.

Example 1

Resin Particle Producing Step

A polycarbonate resin (glass transition temperature: 151.6° C., mass average molecular weight: 51,000, melt mass-flow rate: 9 g/10 min, specific gravity: 1.20) and an amorphous polyester resin (glass transition temperature: 110.8° C., IV value: 0.72, specific gravity: 1.18) were taken at a mass ratio of 80:20, and dried at 100° C. for 6 hours. The obtained dried product (resin composition) was supplied to a 40-mm-diameter single-screw extruder at a rate of 10 kg/hr, and melted and kneaded at 280° C. Subsequently, the resultant was extruded from the die holes (four nozzles with a diameter of 1.5 mm) of a die (temperature: 280° C., resin pressure on the inlet side: 15 MPa) mounted at the front end of the single-screw extruder into a chamber containing cooling water of about 10° C. Then, the rotating shaft of a rotary blade with four cutting blades was rotated at a rotational speed of 5400 rpm to cut it into granules, followed by cooling with the cooling water, thereby producing resin particles.

Impregnation Step 100 parts by mass of the resin particles were sealed in a pressure container. After replacing the inside of the pressure container with carbon dioxide, carbon dioxide was pumped into the container to 0.9 MPa (gauge pressure), and the resin particles were impregnated with carbon dioxide. The resultant was allowed to stand in an environment of 20° C. After 24 hours of impregnation, the pressure container was slowly depressurized over 5 minutes. In this way, the resin particles were impregnated with carbon dioxide, thereby obtaining expandable particles.

Foaming Step

Immediately after depressurization in the impregnation step, the expandable particles were taken out from the pressure container. The expandable particles were transferred to a high-pressure foaming tank, and the expandable particles were foamed using water vapor while stirring at a foaming temperature of 135° C. for 40 seconds. After foaming, the particles were taken out from the high-pressure foaming tank, and dried in a flash dryer, thereby obtaining foam particles. The bulk density of the obtained foam particles measured by the method described above was 0.12 g/cm³.

Molding Step

The obtained foam particles were allowed to stand for 1 day at room temperature (23° C.), and then sealed in a pressure container, and compressed air was pumped into the pressure container to 0.5 MPa (gauge pressure). After standing alone at a pressure container temperature of 20° C., pressure aging was performed for 24 hours. After removal, the particles were placed in a molding die (30 mm×300 mm×400 mm), heated with water vapor of 0.45 MPa for 40 seconds, and then cooled until the maximum surface pressure of a foam molded body was reduced to 0.01 MPa, thereby obtaining the foam molded body.

Example 2

A foam molded body was obtained in the same manner as in Example 1, except that the polycarbonate resin and the amorphous polyester resin were taken at a mass ratio of 50:50, in the foaming step, foaming was performed while stirring at a foaming temperature of 120° C. for 40 seconds, and in the molding step, heating with water vapor of 0.26 MPa was performed for 40 seconds.

Example 3

A foam molded body was obtained in the same manner as in Example 1, except that the polycarbonate resin and the amorphous polyester resin were taken at a mass ratio of 20:80, in the foaming step, foaming was performed while stirring at a foaming temperature of 110° C. for 40 seconds, and in the molding step, heating with water vapor of 0.15 MPa was performed for 40 seconds.

Example 4

A foam molded body was obtained in the same manner as in Example 1, except that the polycarbonate resin was changed to a polycarbonate resin (glass transition temperature: 148.0° C., mass average molecular weight: 48,000, melt mass-flow rate: 12 g/10 min, specific gravity: 1.20), the polycarbonate resin and the amorphous polyester resin were taken at a mass ratio of 60:40, in the foaming step, foaming was performed while stirring at a foaming temperature of 123° C. for 40 seconds, and in the molding step, heating with water vapor of 0.30 MPa was performed for 40 seconds.

Example 5

A foam molded body was obtained in the same manner as in Example 4, except that the amorphous polyester resin was changed to an amorphous polyester resin (glass transition temperature: 120.4° C., IV value: 0.64, specific gravity: 1.17), and the polycarbonate resin and the amorphous polyester resin were taken at a mass ratio of 40:60.

Example 6

A foam molded body was obtained in the same manner as in Example 4, except that in the foaming step, foaming was performed while stirring at a foaming temperature of 123° C. for 20 seconds.

Example 7

A foam molded body was obtained in the same manner as in Example 4, except that in the foaming step, foaming was performed while stirring at a foaming temperature of 123° C. for 30 seconds.

Comparative Example 1

A foam molded body was obtained in the same manner as in Example 1, except that a polycarbonate resin (glass transition temperature: 148.0° C., mass average molecular weight: 48,000, melt mass-flow rate: 12 g/10 min, specific gravity: 1.20) was taken at a mass ratio of 100, in the foaming step, foaming was performed while stirring at a foaming temperature of 142° C. for 50 seconds, and in the molding step, heating with water vapor of 0.85 MPa was performed for 40 seconds.

Comparative Example 2

Foam particles were obtained in the same manner as in Comparative Example 1, except that the amorphous polyester resin was changed to an amorphous polyester resin (glass transition temperature: 78.9° C., IV value: 0.67, specific gravity: 1.28, PETG), the polycarbonate resin and the amorphous polyester resin were taken at a mass ratio of 60:40, and in the foaming step, foaming was performed while stirring at a foaming temperature of 125° C. for 40 seconds. In the molding step, heating with water vapor of 0.30 MPa was performed for 40 seconds; however, a foam molded body could not be obtained.

In Comparative Example 2, two glass transition temperatures were observed due to insufficient compatibility between the polycarbonate resin and PETG.

Comparative Example 3

Foam particles were obtained in the same manner as in Example 1, except that an amorphous polyester resin (glass transition temperature: 120.4° C., IV value: 0.64, specific gravity: 1.17) was taken at a mass ratio of 100, and foaming was performed while stirring at a foaming temperature of 118° C. for 40 seconds. In the molding step, heating with water vapor of 0.17 MPa was performed for 40 seconds; however, a foam molded body could not be obtained.

The results of the Examples and Comparative Examples are shown in Table 1. In Table 1, "PC" refers to a polycarbonate resin, "PCT" to an amorphous polyester resin containing a cyclohexanedimethanol-derived unit and a tetramethyl cyclobutanediol-derived unit, and "PETG" to an amorphous polyester resin containing an ethylene glycol-derived unit and a cyclohexanedimethanol-derived unit.

TABLE 1

| | | | | Example | | | | | | Comparative Example | | |
|---|---|---|---|---|---|---|---|---|---|---|---|---|
| | | Unit | 1 | 2 | 3 | 4 | 5 | 6 | 7 | 1 | 2 | 3 |
| Resin composition | PC | Glass transition temperature | 151.6° C. | | | 148.0° C. | | | | | — | |
| | | Mass ratio | 80 | 50 | 20 | 60 | 40 | 60 | 60 | 100 | 60 | — |

TABLE 1-continued

| | | Unit | Example 1 | 2 | 3 | 4 | 5 | 6 | 7 | Comparative Example 1 | 2 | 3 |
|---|---|---|---|---|---|---|---|---|---|---|---|---|
| | PCT | Glass transition temperature | | 110.8° C. | | | 120.4° C. | 110.8° C. | | — | — | 120.4° C. |
| | | Mass ratio | 20 | 50 | 80 | 40 | 60 | 40 | 40 | — | — | 100 |
| | PETG | Glass transition temperature | — | — | — | — | — | — | — | — | 78.9° C. | — |
| | | Mass ratio | — | — | — | — | — | — | — | — | 40 | — |
| | MFR | g/10 min | 21 | 24 | 21 | 21 | 23 | 21 | 21 | 12 | 39 | 26 |
| | Melt tension | cN | 0.8 | 0.9 | 1.5 | 1.0 | 0.9 | 1.0 | 1.0 | 0.5 | 0.3 | 1.6 |
| | Glass transition temperature | ° C. | 143.5 | 128.8 | 118.0 | 131.8 | 129.3 | 131.8 | 131.8 | 148.6 | 83.2/ 134.4 | 118.9 |
| Foam particles | Bulk density | g/cm³ | 0.12 | 0.12 | 0.12 | 0.12 | 0.12 | 0.17 | 0.14 | 0.12 | 0.40 | 0.15 |
| Foam molded body | Density | g/cm³ | 0.12 | 0.12 | 0.12 | 0.12 | 0.12 | 0.17 | 0.14 | 0.12 | — | — |
| | Absorbed energy | J | 0.58 | 0.68 | 0.63 | 0.70 | 0.65 | 0.63 | 0.69 | 0.52 | — | — |
| | Appearance | | B | A | A | A | A | A | A | B | C | C |

Table 1 reveals that foam molded bodies obtained from a resin composition comprising a base resin containing a polycarbonate resin having a specific glass transition temperature, and an amorphous polyester resin having a specific glass transition temperature and containing a unit derived from a cyclic diol, have excellent mechanical properties and a beautiful appearance.

The invention claimed is:

1. Foam particles obtained by foaming a resin composition,
    wherein the resin composition comprises a base resin comprising a polycarbonate resin having a glass transition temperature of 140 to 155° C. and an amorphous polyester resin having a glass transition temperature of 100 to 130° C.,
    the amorphous polyester comprises a cyclohexanedimethanol-derived unit and a tetramethyl cyclobutanediol-derived unit,
    the resin composition has a glass transition temperature of 115 to 131.8° C., and
    the resin composition has a melt mass-flow rate of 15 to 25 g/10 min.

2. The foam particles according to claim 1, wherein the base resin comprises the polycarbonate resin and the amorphous polyester resin in a mass ratio (polycarbonate resin: amorphous polyester resin) of 95:5 to 5:95.

3. The foam particles according to claim 1, wherein the cyclohexanedimethanol-derived unit is 1,4-cyclohexanedimethanol, and the tetramethyl cyclobutanediol-derived unit is 2,2,4,4-tetramethyl-1,3-cyclobutanediol.

4. The foam particles according to claim 1, wherein the resin composition has a melt tension of 0.6 to 1.5 cN.

5. A foam molded body obtained by foaming and molding the foam particles according to claim 1.

6. The foam molded body according to claim 5, wherein the foam molded body has an absorbed energy of 0.55 J or more.

7. A composite structure member comprising the foam molded body according to claim 5, and a skin material integrally laminated on a surface of the foam molded body.

8. The composite structure member according to claim 7, wherein the skin material is a fiber-reinforced plastic.

9. The composite structure member according to claim 7, for wind turbine blades, robot arms, or automobile parts.

* * * * *